US012571464B1

(12) United States Patent
Zhang et al.

(10) Patent No.: US 12,571,464 B1
(45) Date of Patent: Mar. 10, 2026

(54) CAM AND HARMONIC REDUCER

(71) Applicant: GREE ELECTRIC APPLIANCES, INC. OF ZHUHAI, Zhuhai (CN)

(72) Inventors: Yachao Zhang, Zhuhai (CN); Jiangfeng Tang, Zhuhai (CN); Jiajia Gu, Zhuhai (CN); Zhongfu Cheng, Zhuhai (CN); Yunfei Liu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 19/105,450

(22) PCT Filed: May 5, 2023

(86) PCT No.: PCT/CN2023/092182
§ 371 (c)(1),
(2) Date: Feb. 21, 2025

(87) PCT Pub. No.: WO2024/045676
PCT Pub. Date: Mar. 7, 2024

(30) Foreign Application Priority Data

Aug. 29, 2022 (CN) .......................... 202211066353.1

(51) Int. Cl.
*F16H 53/02* (2006.01)
*F16H 49/00* (2006.01)

(52) U.S. Cl.
CPC ........... *F16H 53/02* (2013.01); *F16H 49/001* (2013.01)

(58) Field of Classification Search
CPC ............................... F16H 53/02; F16H 49/001
See application file for complete search history.

(56) References Cited

U.S. PATENT DOCUMENTS

2007/0101820 A1 5/2007 Bulatowicz
2015/0107387 A1 4/2015 Kuo
(Continued)

FOREIGN PATENT DOCUMENTS

CN 108427779 A 8/2018
CN 111120622 A 5/2020
(Continued)

OTHER PUBLICATIONS

Office action issued in corresponding CN applicaton 202211066353.2 dated May 20, 2025.
(Continued)

*Primary Examiner* — Terence Boes
(74) *Attorney, Agent, or Firm* — Armstrong Teasdale LLP

(57) ABSTRACT

Disclosed herein are a cam and a harmonic reducer. The cam includes a cam main body, where an outer contour line of the cam main body includes a plurality of engagement region contour curves and a plurality of non-engagement region contour curves; the engagement region contour curves and the non-engagement region contour curves are alternately connected to jointly form the outer contour line of the cam main body; the engagement region contour curves and the non-engagement region contour curves are tangent to each other at intersections; each engagement region contour curve includes a first curve and a second curve, and the first curve and the second curve are connected and are tangent to each other at a joint; a first segment of the first curve protrudes more outwards than a first segment of the second curve.

20 Claims, 7 Drawing Sheets

(56) References Cited

U.S. PATENT DOCUMENTS

| | | | | |
|---|---|---|---|---|
| 2017/0253150 A1* | 9/2017 | Wei | ........................ | F16H 49/001 |
| 2020/0040978 A1* | 2/2020 | Kanayama | ............ | F16H 49/001 |

FOREIGN PATENT DOCUMENTS

| | | | |
|---|---|---|---|
| CN | 112610674 A | 4/2021 |
| CN | 114110136 A | 3/2022 |
| CN | 114370486 A | 4/2022 |
| CN | 115325133 A | 11/2022 |
| CN | 217898700 U | 11/2022 |
| DE | 102020121638 A1 | 4/2021 |

OTHER PUBLICATIONS

International Search Report for PCT/CN2023/092182 dated Aug. 13, 2023, 5 pages.

Written Opinion for PCT/CN2023/092182 dated Aug. 13, 2023, 4 pages.

* cited by examiner

CAM AND HARMONIC REDUCER

CROSS-REFERENCE TO RELATED APPLICATION

The present application is a national stage application of international Patent Application No. PCT/CN2023/092182, which is filed on May 5, 2023, and claims priority of Chinese Patent Application 202211066353.2, filed on Aug. 29, 2022, and entitled "Cam for Harmonic Reducer and Harmonic Reducer", the contents of which are herein incorporated by reference in its entirety.

TECHNICAL FIELD

The present application belongs to the technical field of reducers, and particularly relates to a cam and a harmonic reducer.

BACKGROUND

A harmonic reducer is a transmission device that uses a wave generator to cause a flexible gear to generate controllable elastic deformation to be engaged with a rigid gear so as to transmit motion and power. During use, the wear of the wave generator and the gears of the harmonic reducer is a main factor that causes attenuation in the precision of the reducer, and the contour of a cam has the greatest impact on the engagement condition between the wave generator and gear teeth, therefore it is a key point to perform a reasonable design on the contour of the cam of the wave generator. The traditional design of the contour of the cam is based on the deformation of the flexible gear under a no-load condition, rather than the deformation of the flexible gear under an actual load condition, such that the performance of the harmonic reducer during actual work is worse compared with a no-load performance, and relatively large wear is generated after a period of time, thus shortening the service life of the harmonic reducer.

In view of the above problems, an effective solution has not been proposed yet.

SUMMARY

At present, provided are a cam for a harmonic reducer and the harmonic reducer, which are designed based on a deformation theory of a flexible gear under actual load conditions.

In one aspect, the present application provides a cam for a harmonic reducer, wherein the cam includes a cam main body, and an outer contour line of the cam main body includes a plurality of engagement region contour curves and a plurality of non-engagement region contour curves; the plurality of engagement region contour curves and the plurality of non-engagement region contour curves are alternately connected to jointly form the outer contour line of the cam main body; and the plurality of engagement region contour curves and the plurality of non-engagement region contour curves are tangent to each other at intersections.

Each of the plurality of engagement region contour curve includes a first curve and a second curve, and the first curve and the second curve are connected and are tangent to each other at a joint.

An end of the first curve connected with the second curve is a first segment of the first curve, and another end of the first curve is a second segment of the first curve; the end of the second curve connected with the first curve is a first segment of the second curve, and the other end of the second curve is a second segment of the second curve; and the first segment of the first curve protrudes more outwards than the first segment of the second curve, and the second segment of the second curve protrudes more outwards than the second segment of the first curve.

In one embodiment of the present application, a plurality of first curves of the plurality of engagement region contour curve are uniformly distributed on an outer contour of the cam main body, and a plurality of second curves of the plurality of engagement region contour curve are uniformly distributed on the outer contour of the cam main body.

In one embodiment of the present application, there are two engagement regions, which are symmetrically distributed with respect to a center, and there are two non-engagement regions, which are symmetrically distributed with respect to a rotation center of the cam.

In one embodiment of the present application, the outer contour line is placed in a polar coordinate system, wherein an intersection point of the first curve and the second curve in one engagement region is disposed on a 0X polar axis, and a rotation center of the cam main body coincides with a polar coordinate origin o.

An equation of the first curve is:

$$\rho = r + \omega_0 \times \left( \cos 2\phi - \frac{\omega 1}{2\xi \times \sin 2\phi \times \sin 2\phi} \right),$$

wherein $\rho$ is a polar coordinate radius; r is a base radius; $\omega_0$ and $\omega_1$ are deformation coefficients; $\xi$ is a contour adjustment parameter, $-3 < \xi < -1$; and $\phi$ is an angle variable, $0 \le \phi \le 2\pi/9$, and $\pi \le \phi \le 11\pi/9$.

In one embodiment of the present application, an equation of the second curve is:

$$\rho = r + \omega_0 \times \cos 2\phi - \omega_1 \times \cos 4\phi,$$

wherein $\rho$ is a polar coordinate radius, r is a base radius, $\omega_0$ and $\omega_1$ are deformation coefficients, $\phi$ is an angle variable, $$\frac{7\pi}{9} \le \phi \le \pi$$

and $$\frac{16\pi}{9} \le \phi \le 2\pi.$$

In one embodiment of the present application, an equation of an outer contour curve of the non-engagement region is:

$$\rho = r + \omega_0 \times \cos 2\phi;$$

wherein $\rho$ is a polar coordinate radius, r is a base radius, $\omega_0$ is a deformation coefficient, $\phi$ is an angle variable, $$\frac{2\pi}{9} \le \phi \le \frac{7\pi}{9}$$

and $$\frac{11\pi}{9} \le \phi \le \frac{16\pi}{9}.$$

In one embodiment of the present application, there are three engagement regions, and there are three non-engagement regions; and the three engagement regions and the three non-engagement regions are alternately distributed on an outer peripheral surface of the cam main body.

In one embodiment of the present application, the first curve and the non-engagement region contour curve adjacent to each other are a same curve.

In one embodiment of the present application, the rotation center of the cam main body coincides with an origin o of a polar coordinate system, and an intersection point of the first curve and the second curve in one engagement region is placed on an OX polar axis; and a curve equation of the first curve and the non-engagement region contour curve adjacent to each other is:

$$\rho = r_0 + \omega_0 \times \cos 3\phi;$$

$$\frac{k-1}{3}\pi \le \phi \le \frac{2k+1}{6}\pi,$$

k=1,3,5; wherein $\rho$ is a polar coordinate radius, $r_0$ is a base radius, $\omega_0$ is the deformation coefficients, and $\phi$ is an angle variable.

In one embodiment of the present application, an equation of the second curve is:

$$\rho = r_0 + \omega_0 \times \cos 3\phi + \omega_1 \times 3 \times \sin 4\phi - \omega_1 \times 4 \times \sin 4\phi^3;$$

$$\frac{4k-1}{6}\pi \le \phi \le \frac{2k}{3}\pi,$$

k=1, 2, 3; wherein $\rho$ is a polar coordinate radius, $r_0$ is a base radius, $\omega_0$ and $\omega_1$ are deformation coefficients, and $\phi$ is an angle variable.

In another aspect, the present application further provides a harmonic reducer, including a rigid gear, a flexible gear, and the cam described in any of the foregoing embodiments, wherein the flexible gear is sleeved on an outer peripheral surface of the cam, and the rigid gear is sleeved on an outer peripheral surface of the flexible gear.

In the present application, the outer contour curve of the engagement region is divided into the first curve and the second curve at a vertex of the engagement region contour curve of the cam, the first segment of the first curve protrudes more, and the second segment of the second curve protrudes more. When the cam rotates towards the direction of the first curve, the harmonic reducer is more accurate. When the cam rotates towards the direction of the second curve, the harmonic reducer bears a larger bearing capacity and is more stable in stress.

BRIEF DESCRIPTION OF THE DRAWINGS

Figure 3:
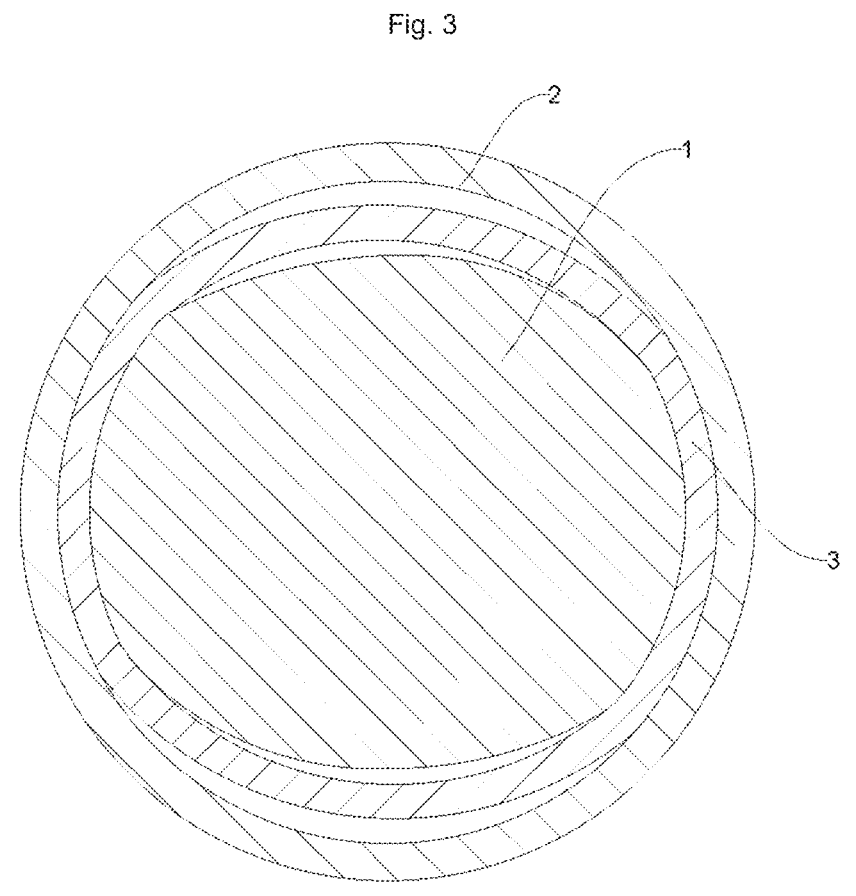

FIG. 3 illustrates a schematic diagram of a mutual relationship between a dual-wave cam, a flexible gear and a rigid gear according to an embodiment of the present application;

Figure 4:
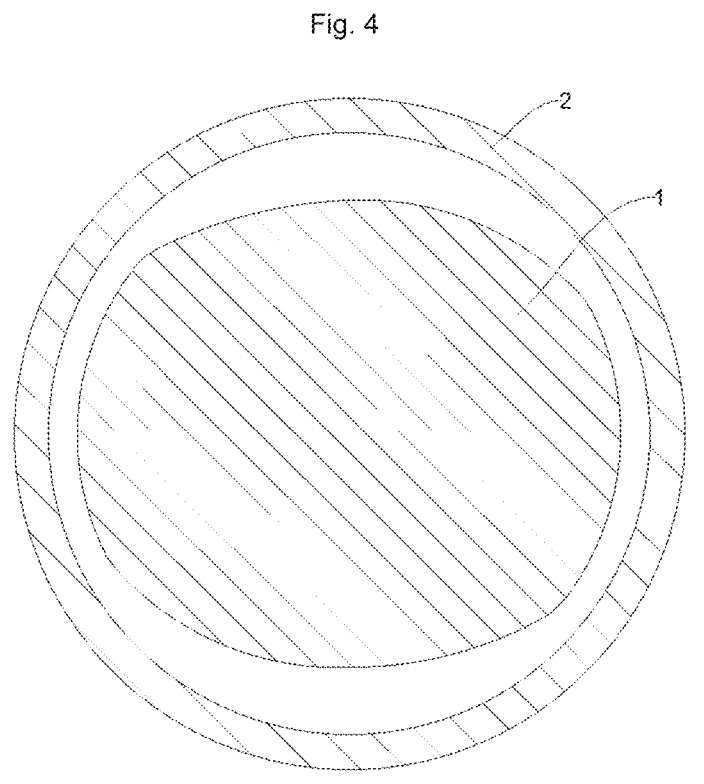

FIG. 4 illustrates a schematic diagram of a mutual relationship between a dual-wave cam and a rigid gear according to an embodiment of the present application;

FIG. 5 illustrates a schematic diagram of comparison between a first curve and a second curve of an engagement region of a cam according to an embodiment of the present application;

Figure 1:
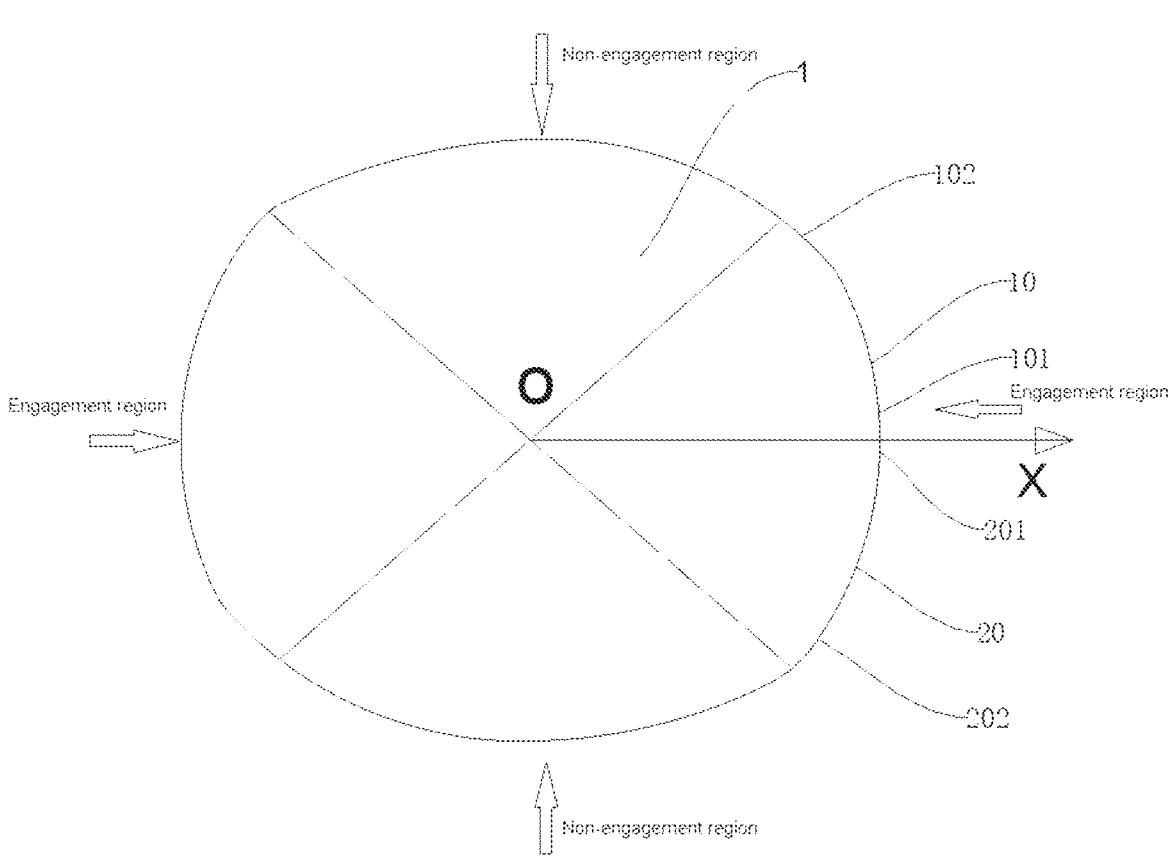
FIG. 1 illustrates a schematic diagram of a dual-wave cam according to an embodiment of the present application.

The drawings described herein are used to provide a further understanding of the present application and constitute a part of the present application, and schematic embodiments of the present application and descriptions thereof are used to explain the present application, and do not constitute an improper limitation on the present application.

In the drawings: 1—cam main body; 2—rigid gear; 3—flexible gear; 10—first curve; 20—second curve; 101—first segment of the first curve; 102—second segment of the first curve; 201—first segment of the second curve; 202—second segment of the second curve.

DETAILED DESCRIPTION OF THE EMBODIMENTS

In order to enable those skilled in the art to better understand the solutions of the present application, a clear and complete description of technical solutions in the embodiments of the present application will be given below, in combination with the drawings in the embodiments of the present application. Apparently, the embodiments described below are merely a part, but not all, of the embodiments of the present application. All of other embodiments, obtained by those ordinary skilled in the art based on the embodiments in the present application without any creative effort, fall into the protection scope of the present application.

It should be noted that the terms "first", "second" and the like in the specification, claims and the above drawings of the present application are used to distinguish similar objects, and are not necessarily used to describe a specific order or sequence; "a first segment of a first curve" and "a second segment of the first curve" refer to two opposite segments of regions of the first curve, rather than two points on both ends of the first curve, that is, "the first segment of the first curve" and "the second segment of the first curve" respectively refer to two different segments of curves of the first curve, and the two different segments of curves form the first curve together; similarly, "a first segment of a second curve" and "a second segment of the second curve" refer to two opposite segments of regions of the second curve, rather than two points on both ends of the second curve, that is, the "first segment of the second curve" and the "second segment of the second curve" respectively refer to two different segments of curves of the second curve, and the two different segments of curves form the second curve together; and specific lengths of the first curve and the second curve are determined by equations of the curves and angle variables. It should be understood that data used in this way may be interchanged under appropriate circumstances, so that the embodiments of the present application described herein may be implemented in an order other than those illustrated or described herein. In addition, the terms "include", "have" and any variations thereof are intended to cover non-exclusive inclusions.

The present application relates to a reducer, and particularly relates to a cam for a harmonic reducer and the harmonic reducer. The harmonic reducer is a transmission device that uses a wave generator to cause a flexible gear to generate controllable elastic deformation to be engaged with a rigid gear so as to transmit motion and power. During a transmission process, the wear of the wave generator and gears of the harmonic reducer is a main factor that causes attenuation in the precision of the reducer, and a contour of the cam has the greatest impact on the engagement condition between the wave generator and gear teeth, therefore it is a key point to perform a reasonable design on the contour of the cam of the wave generator. The traditional design of the contour of the cam is based on the deformation of the flexible gear under a no-load condition, rather than the deformation of the flexible gear under an actual load condition, such that the performance of the harmonic reducer during actual work is worse compared with a no-load performance, and relatively large wear is generated after a period of time, thus shortening the service life of the harmonic reducer.

In view of the above problems, provided are a cam for a harmonic reducer and the harmonic reducer, which are designed based on a deformation theory of a flexible gear under actual load conditions.

The harmonic reducer is taken as an example to introduce the present application, as shown in FIGS. 1-4 and FIG. 7, the harmonic reducer includes a rigid gear 2, a flexible gear 3 and a cam. The flexible gear 3 is sleeved on an outer peripheral surface of the cam, and the rigid gear 2 is sleeved on an outer peripheral surface of the flexible gear 3. The cam of the harmonic reducer includes a cam main body 1, wherein engagement regions and non-engagement regions are alternately distributed on an outer peripheral surface of the cam main body 1, and an outer contour line of the cam main body 1 includes a plurality of engagement region contour curves and a plurality of non-engagement region contour curves. The plurality of engagement region contour curves and the plurality of non-engagement region contour curves are alternately connected to jointly form the outer contour line of the cam main body 1. The plurality of engagement region contour curves and the plurality of non-engagement region contour curves are tangent to each other at intersections; each of the plurality of engagement region contour curve includes a first curve 10 and a second curve 20, and the first curve 10 and the second curve 20 are connected and are tangent to each other at a joint; an end of the first curve 10 connected with the second curve 20 is a first segment 101 of the first curve, and another end of the first curve is a second segment 102 of the first curve; and an end of the second curve 20 connected with the first curve 10 is a first segment 201 of the second curve, and another end of the second curve is a second segment 202 of the second curve. The first segment 101 of the first curve protrudes more outwards than the first segment 201 of the second curve, and the second segment 202 of the second curve protrudes more outwards than the second segment 102 of the first curve. When the cam rotates towards one side of the first curve 10, an area where a part of the flexible gear 3 corresponding to the second curve 20 is engaged with the rigid gear 2 to serve as a main bearing region, an area where a part of the flexible gear 3 corresponding to the first curve 10 is engaged with the rigid gear 2 to serve as an auxiliary bearing region, an engagement between the flexible gear 3 and the rigid gear 2 in the main bearing region is not affected by the second curve 20, and a gap between the flexible gear 3 and the rigid gear 2 in the auxiliary bearing region is smaller under the action of an outer peripheral surface where the first curve 10 is located, so that the cooperation between the flexible gear 3 and the rigid gear 2 is more accurate.

When the cam rotates towards one side of the second curve 20, an area where a part of the flexible gear 3 corresponding to the first curve 10 is engaged with the rigid gear 2 to serve as a main bearing region, an area where a part of the flexible gear 3 corresponding to the second curve 20 is engaged with the rigid gear 2 to serve as an auxiliary bearing region, an engagement between the flexible gear 3 and the rigid gear 2 in the main bearing region is not affected by an outer peripheral surface where the first curve 10 is located, and a number of engaged teeth of the flexible gear 3 and the rigid gear 2 is increased under the action of the outer peripheral surface where the second curve 20 is located, so that the maximum load of the cooperation between the flexible gear 3 and the rigid gear 2 is increased, and thus the bearing capacity of the harmonic reducer is improved.

The first segment 101 of the first curve protrudes more outwards than the first segment 201 of the second curve means that a maximum distance from the first segment 101 of the first curve to a rotation center of the cam is greater than a maximum distance from the first segment 201 of the second curve to the rotation center of the cam.

The second segment 202 of the second curve protrudes more outwards than the second segment 102 of the first curve means that a maximum distance from the second segment 202 of the second curve to the rotation center of the cam is greater than a maximum distance from the second segment 102 of the first curve to the rotation center of the cam.

The engagement region refers to an area where a teeth of a flexible gear contact and transmit force with a teeth of a rigid gear. The engagement region contour curve refers to an outer contour line of the cam main body 1 that corresponds to the engagement region.

Figure 5:
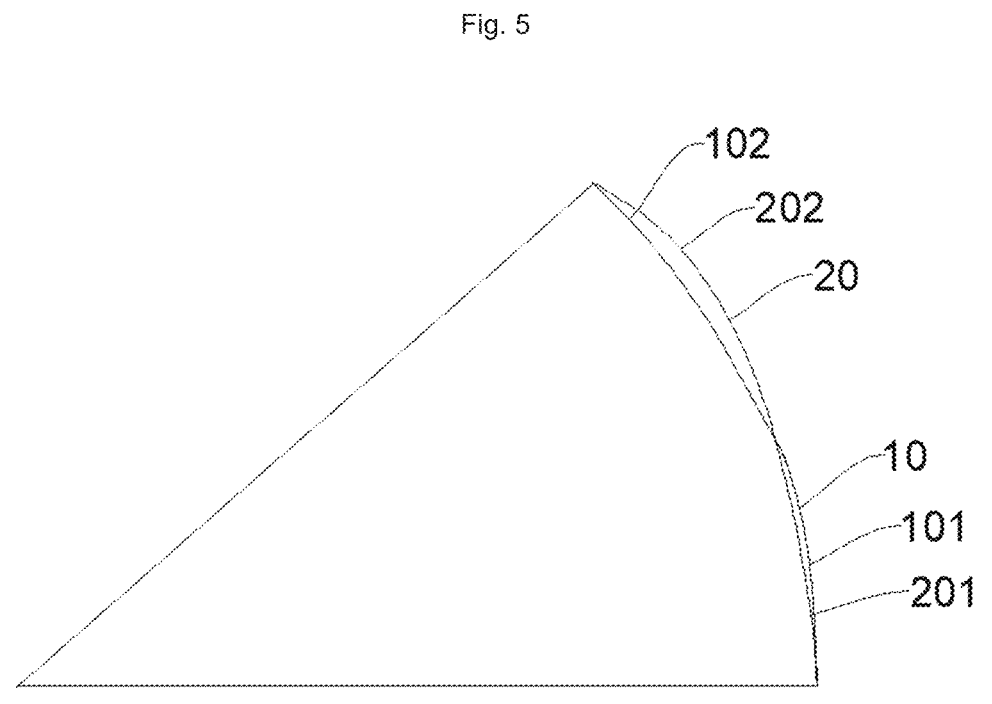

As shown in FIG. 5, it is a schematic diagram of comparison between the first curve 10 and the second curve 20 of an engagement region on the outer contour of the cam, and after the first curve 10 and the second curve 20 are folded, the first segment 101 of the first curve protrudes more outwards than the first segment 201 of the second curve, and the second segment 202 of the second curve protrudes more outwards than the second segment 102 of the first curve.

In some embodiments, the cam main body 1 is provided with at least two engagement regions and two non-engagement regions. An outer contour of each of the at least two engagement region of the cam main body 1 includes the first curve 10 and the second curve 20. A plurality of first curves 10 of the at least two engagement regions are uniformly distributed on an outer contour of the cam main body 1, and a plurality of second curves 20 of the at least two engagement regions are uniformly distributed on the outer contour of the cam main body 1. FIG. 1 is a schematic diagram of a dual-wave cam according to an embodiment of the present application, and as shown in FIG. 1, the cam main body 1 is provided with two engagement regions and two non-engagement regions. The two engagement regions are symmetrically distributed with respect to a rotation center of the cam, and the two non-engagement regions are symmetrically distributed with respect to the rotation center of the cam. In this way, the flexible gear 3 and the rigid gear 2 can be stressed more evenly, and the harmonic reducer operates more stably, thereby reducing unnecessary vibration and noise.

In some embodiments, as shown in FIG. 1, the outer contour line of the cam main body 1 is placed in a polar coordinate system, wherein an intersection point of the first curve 10 and the second curve 20 in one engagement region is disposed on a 0X polar axis, and the rotation center of the cam main body 10 coincides with a polar coordinate origin o. An equation of the first curve 10 of the outer contour line of the engagement region of the cam main body 1 is:

$$\rho = r + \omega_0 \times \left( \cos 2\phi - \frac{\omega 1}{2\xi \times \sin 2\phi \times \sin 2\phi} \right),$$

wherein ρ is a polar coordinate radius; r is a base radius; $\omega_0$ and $\omega_1$ are deformation coefficients; ξ is a contour adjustment parameter, $-3<\xi<-1$; and φ is an angle variable, $0\leq\phi\leq2\pi/9$, and $\pi\leq\phi\leq11\pi/9$. An equation of the second curve 20 is: $\rho = r + \omega_0 \times \cos 2\phi - \omega_1 \times \cos 4\phi$, wherein ρ is a polar coordinate radius, r is a base radius, $\omega_0$ and $\omega_1$ are deformation coefficients, φ is an angle variable, $$\frac{7\pi}{9} \leq \phi \leq \pi$$

and $$\frac{16\pi}{9} \leq \phi \leq 2\pi.$$

In the cam main body 1 set according to the above formulas, ana an engagement region where the first curve 10 is located ensures a smaller gap between the flexible gear 3 and the rigid gear 2 when the cam extrudes the flexible gear 3, and meanwhile avoid the situation in which the service life is reduced caused by an increase in the friction between the flexible gear 3 and the cam due to excessive deformation of the flexible gear 3. In the cam main body 1 set according to the above formulas, an engagement region where the second curve 20 is located ensures a greater number of engaged teeth between the flexible gear 3 and the rigid gear 2 when the cam extrudes the flexible gear 3, and meanwhile avoid the situation in which the service life is reduced caused by an increase in the friction between the flexible gear 3 and the cam due to excessive deformation of the flexible gear 3.

In one embodiment, as shown in FIG. 1, an equation of an outer contour curve of the non-engagement region is: $\rho = r + \omega_0 \times \cos 2\phi$, wherein ρ is a polar coordinate radius, r is a base radius, $\omega_0$ is a deformation coefficient, φ is an angle variable, $$\frac{2\pi}{9} \leq \phi \leq \frac{7\pi}{9}$$

and $$\frac{11\pi}{9} \leq \phi \leq \frac{16\pi}{9}.$$

According to the above formula, the engagement region and the non-engagement region of the cam are in smooth transition, thereby ensuring the own rigidity and structural strength of the cam, and meanwhile avoiding an increase in unnecessary friction caused by the contact between the non-engagement region and the flexible gear 3.

Figure 2:
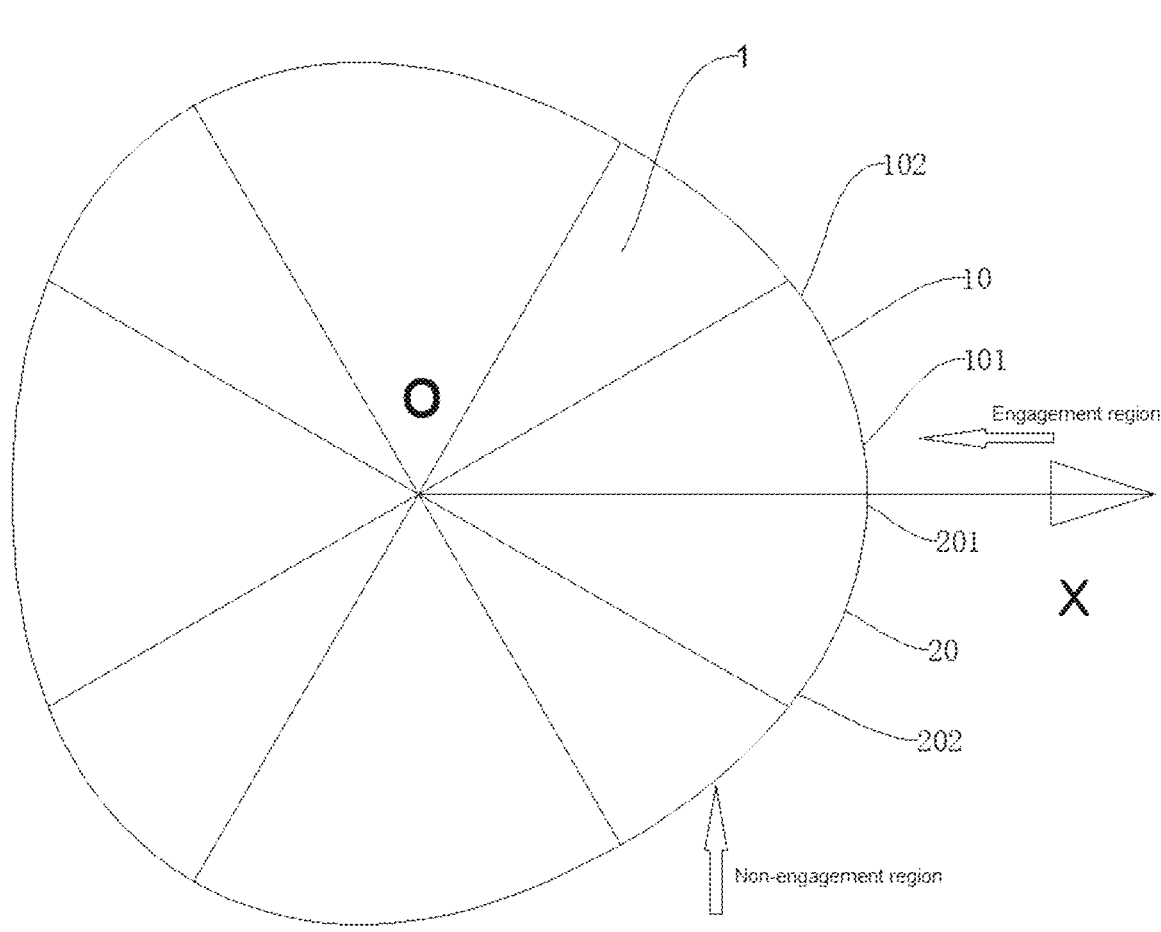
FIG. 2 illustrates a schematic diagram of a three-wave cam according to an embodiment of the present application.

FIG. 2 is a schematic diagram of a three-wave cam according to an embodiment of the present application, and as shown in FIG. 2, in some embodiments, there are three engagement regions, and there are three non-engagement regions. The three engagement regions and the three non-engagement regions are alternately distributed on the outer peripheral surface of the cam main body 1. The first curve 10 and the non-engagement region contour curve adjacent to each other are a same curve. The cam is also referred to as a three-wave cam. The three-wave cam makes the difference between the number of teeth of the flexible gear 3 and the number of teeth of the rigid gear 2 be an integer multiple of three, and the dual-wave cam makes the difference between the number of teeth of the flexible gear 3 and the number of teeth of the rigid gear 2 be an integer multiple of two. The three-wave cam ensures higher cooperation precision of the flexible gear 3 and the rigid gear 2. Since the non-engagement region contour curve and the first curve 10 are the same curve, the machining difficulty can be effectively reduced on the premise of ensuring normal operation.

In some embodiments, as shown in FIG. 2, the rotation center of the cam main body 1 coincides with the origin o of the polar coordinate system, and the intersection point of the first curve 10 and the second curve 20 in one engagement region is placed on the X axis. A curve equation of the first curve 10 and the non-engagement region contour curve adjacent to each other is: $\rho = r_0 + \omega_0 \times \cos 3\phi$;

$$\frac{k-1}{3}\pi \leq \phi \leq \frac{2k+1}{6}\pi,$$

$k=1, 3, 5$; wherein p is a polar coordinate radius, $r_0$ is a base radius, $\omega_0$ is a deformation coefficients, and φ is an angle variable. An equation of the second curve 20 is: $\rho = r_0 + \omega_0 \times \cos 3\phi + \omega_1 \times 3 \times \sin 4\phi - \omega_1 \times 4 \times \sin 4\phi^3$;

$$\frac{4k-1}{6}\pi \leq \phi \leq \frac{2k}{3}\pi,$$

$k=1, 2, 3$, wherein ρ is a polar coordinate radius, $r_0$ is a base radius, $\omega_0$ and $\omega_1$ are deformation coefficients, and φ is an angle variable. In the cam main body 1 set according to the above formulas, the bearing capacity and the transmission precision of the three-wave cam are greatly improved.

Figure 6:
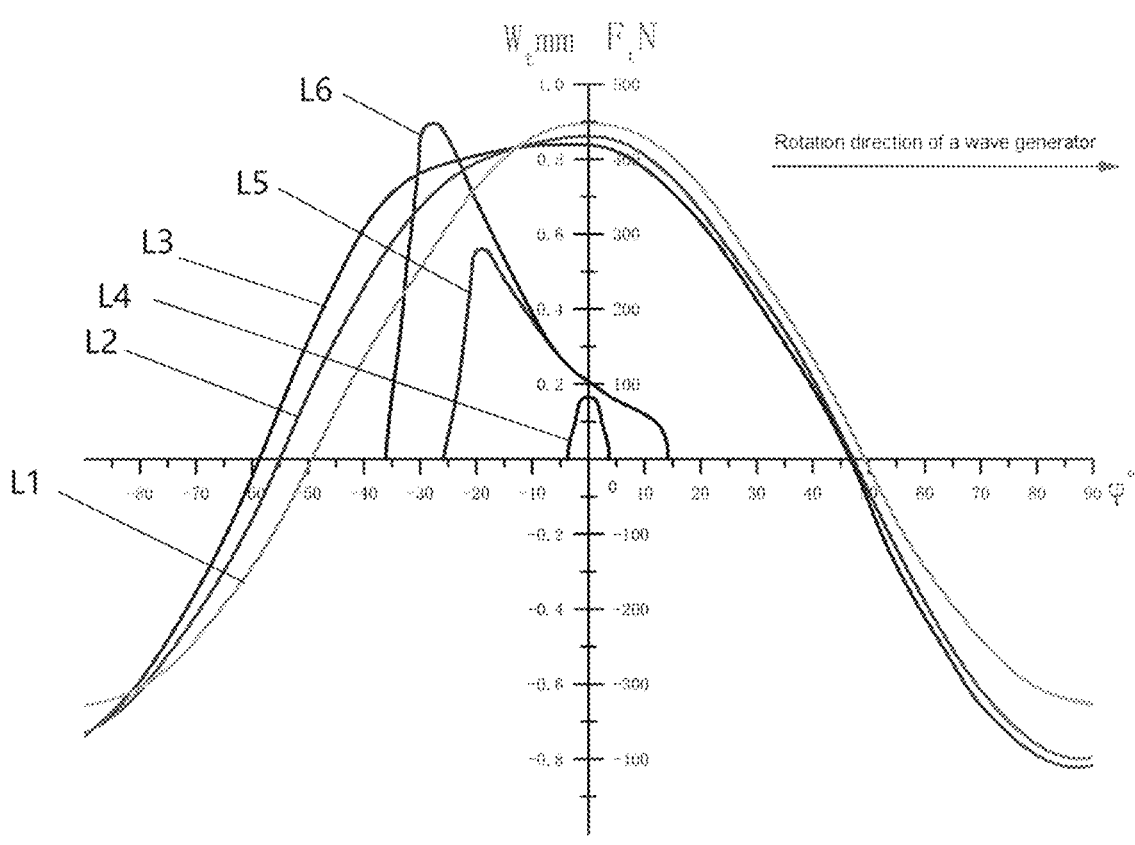
FIG. 6 illustrates a curve chart of radial displacement of a flexible gear and gear tooth load of the flexible gear according to an embodiment of the present application.
Figure 7:
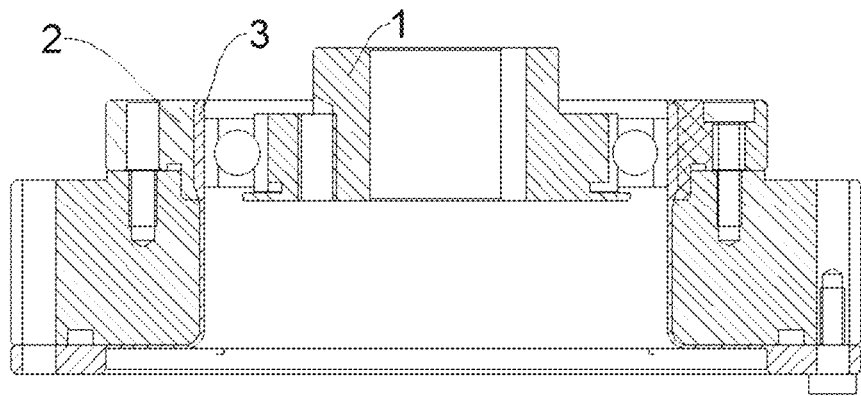
FIG. 7 illustrates a schematic sectional view of a harmonic reducer according to an embodiment of the present application.

As can be seen from tests, as shown in FIG. 6, it shows test curves of a radial displacement $w_r$ of the flexible gear 3 transmitted by a wave generator of the cam and an on-tooth load $F_r$ of the flexible gear 3, wherein the curves L1, L2 and L3 respectively show change conditions of the radial displacement $w_r$ of the flexible gear 3 under torques of 0, 400 Nm and 800 Nm. As the load on the gear teeth of the flexible gear 3 gradually increases, the radial deformation of the flexible gear 3 also becomes greater, meanwhile the more the main bearing region of the flexible gear 3 protrudes outwards, and the farther the protruding part is away from the joint of the main bearing region and the auxiliary bearing region. The outer contour line of the cam is redesigned according to this feature to improve the bearing capacity is improved. The curves L4, L5 and L6 respectively show changes of the on-tooth load $F_r$ of the flexible gear 3 under the torques of 0, 400 Nm and 800 Nm. As the load of the flexible gear 3 gradually increases, the load on the gear teeth of the flexible gear 3 is correspondingly increased, and the gear tooth bearing the maximum load of the flexible gear 3 is farther away from the joint of the main bearing region and the auxiliary bearing region. The number of engagement between the flexible gear 3 and the rigid gear 2 is increased according to this characteristic of the flexible gear 3, so as to effectively improve the bearing capacity of the harmonic reducer.

For a cam with more wave crests, as long as improvements thereof conform to the principle that the cam rotates in one direction to make a smaller gap between the flexible gear and the rigid gear so as to ensure higher precision of the harmonic reducer, and that the cam rotates in the other direction to increase the number of engagement between the flexible gear and the rigid gear so as to increase the maximum load that the harmonic reducer bears, all these improvements fall within the protection scope of the present application.

The present application has the following significant advantages:

In the present application, the engagement region contour curve is divided into the first curve and the second curve at the vertex of the engagement region contour curve of the cam, the first segment of the first curve protrudes more than the first segment of the second curve, and the second segment of the second curve protrudes more than the first segment of the first curve; when the cam rotates towards the direction of the first curve, the operation of the harmonic reducer is more accurate; and when the cam rotates towards the direction of the second curve, the harmonic reducer bears a larger bearing capacity and is more stable in stress.

Exemplary embodiments of the present disclosure have been shown and described above in detail. It should be understood that the present disclosure is not limited to the detailed structures, setting manners or implementations described herein; and rather, the present disclosure is intended to cover various modifications and equivalent settings included within the spirit and scope of the appended claims.

The invention claimed is:

1. A cam for a harmonic reducer, wherein the cam comprises a cam main body, and an outer contour line of the cam main body comprises a plurality of engagement region contour curves and a plurality of non-engagement region contour curves: the plurality of engagement region contour curves and the plurality of non-engagement region contour curves are alternately connected to jointly form the outer contour line of the cam main body; and the plurality of engagement region contour curves and the plurality of non-engagement region contour curves are tangent to each other at intersections:

each of the plurality of engagement region contour curve comprises a first curve and a second curve, and the first curve and the second curve are connected and are tangent to each other at a joint; and an end of the first curve connected with the second curve is a first segment of the first curve, and another end of the first curve is a second segment of the first curve: an end of the second curve connected with the first curve is a first segment of the second curve, and another end of the second curve is a second segment of the second curve; and the first segment of the first curve protrudes more outwards than the first segment of the second curve, and the second segment of the second curve protrudes more outwards than the second segment of the first curve.

2. The cam as claimed in claim 1, wherein a plurality of first curves of the plurality of engagement region contour curve are uniformly distributed on an outer contour of the cam main body, and a plurality of second curves of the plurality of engagement region contour curve are uniformly distributed on the outer contour of the cam main body.

3. The cam as claimed in claim 2, wherein there are two engagement regions, which are symmetrically distributed with respect to a rotation center of the cam, and there are two non-engagement regions, which are symmetrically distributed with respect to the rotation center of the cam.

4. The cam as claimed in claim 3, wherein the outer contour line is placed in a polar coordinate system, an intersection point of the first curve and the second curve in one engagement region is disposed on a 0X polar axis, and a rotation center of the cam main body coincides with a polar coordinate origin o; and an equation of the first curve is:

$$\rho = r + \omega_0 \times \left( \cos 2\phi - \frac{\omega 1}{2\xi \times \sin 2\phi \times \sin 2\phi} \right),$$

wherein $\rho$ is a polar coordinate radius; r is a base radius; $\omega_0$ and $\omega_1$ are deformation coefficients; $\xi$ is a contour adjustment parameter, $-3 < \xi - 1$; and $\Phi$ is an angle variable, $0 \le \Phi \le 2\pi/9$, and $\pi \le \Phi \le 11\pi/9$.

5. The cam as claimed in claim 3, wherein the outer contour line is placed in the polar coordinate system, an intersection point of the first curve and the second curve in one engagement region is disposed on the 0X polar axis, and a rotation center of the cam main body coincides with the polar coordinate origin o, and an equation of the second curve is:

$$\rho = r + \omega_0 \times \cos 2\phi - \omega_1 \times \cos 4\phi,$$

wherein $\rho$ is a polar coordinate radius, r is a base radius, $\omega_0$ and $\omega_1$ are deformation coefficients, $\Phi$ is an angle variable, $$\frac{7\pi}{9} \le \phi \le \pi$$

and $$\frac{16\pi}{9} \le \phi \le 2\pi.$$

6. The cam as claimed in claim 3, wherein the outer contour line is placed in the polar coordinate system, an intersection point of the first curve and the second curve of one engagement region is disposed on the 0X polar axis, and a rotation center of the cam main body coincides with the polar coordinate origin o, and an equation of an outer contour curve of the non-engagement region is:

$$\rho = r + \omega_0 \times \cos 2\phi,$$

wherein $\rho$ is a polar coordinate radius, r is a base radius, $\omega_0$ is a deformation coefficient, $\Phi$ is an angle variable, $$\frac{2\pi}{9} \le \phi \le \frac{7\pi}{9}$$

and $$\frac{11\pi}{9} \le \phi \le \frac{16\pi}{9}.$$

7. The cam as claimed in claim 2, wherein there are three engagement regions, and there are three non-engagement regions; and the three engagement regions and the three non-engagement regions are alternately distributed on an outer peripheral surface of the cam main body.

8. The cam as claimed in claim 7, wherein the first curve and the non-engagement region contour curve adjacent to each other are a same curve.

9. The cam as claimed in claim 8, wherein a rotation center of the cam main body coincides with an origin o of a polar coordinate system, and an intersection point of the first curve and the second curve in one engagement region is placed on an OX polar axis; and a curve equation of the first curve and the non-engagement region contour curve adjacent to each other is:
$\rho = r_0 + \omega_0 \times \cos 3\phi$;

$$\frac{k-1}{3}\pi \leq \phi \leq \frac{2k+1}{6}\pi,$$

k=1,3,5; wherein $\rho$ is a polar coordinate radius, $r_0$ is a base radius, $\omega_0$ is a deformation coefficients, and $\Phi$ is an angle variable.

10. The cam as claimed in claim 8, wherein the rotation center of the cam main body coincides with the origin o of a polar coordinate system, and an intersection point of the first curve and the second curve in one engagement region is placed on an OX polar axis; and an equation of the second curve is:
$\rho = r_0 + \omega_0 \times \cos 3\phi + \omega_1 \times 3 \times \sin 4\phi - \omega_1 \times 4 \times \sin 4\phi^3$:

$$\frac{4k-1}{6}\pi \leq \phi \leq \frac{2k}{3}\pi,$$

k=1, 2, 3; wherein $\rho$ is a polar coordinate radius, $r_0$ is a base radius, $\omega_0$ and $\omega_1$ are deformation coefficients, and $\Phi$ is an angle variable.

11. A harmonic reducer, comprising a rigid gear, a flexible gear, and the cam as claimed in claim 1, wherein the flexible gear is sleeved on an outer peripheral surface of the cam, and the rigid gear is sleeved on an outer peripheral surface of the flexible gear.

12. The harmonic reducer as claimed in claim 11, wherein a plurality of first curves are uniformly distributed on an outer contour of the cam main body, and a plurality of second curves are uniformly distributed on the outer contour of the cam main body.

13. The harmonic reducer as claimed in claim 12, wherein there are two engagement regions, which are symmetrically distributed with respect to a rotation center of the cam, and there are two non-engagement regions, which are symmetrically distributed with respect to the rotation center of the cam.

14. The harmonic reducer as claimed in claim 13, wherein the outer contour line is placed in a polar coordinate system, an intersection point of the first curve and the second curve in one engagement region is disposed on a OX polar axis, and a rotation center of the cam main body coincides with a polar coordinate origin o; and an equation of the first curve is:

$$\rho = r + \omega_0 \times \left( \cos 2\phi - \frac{\omega 1}{2\xi \times \sin 2\phi \times \sin 2\phi} \right),$$

wherein $\rho$ is a polar coordinate radius; r is a base radius; $\omega_0$ and $\omega_1$ are deformation coefficients; $\xi$ is a contour adjustment parameter, $-3 < \xi < -1$; and $\Phi$ is an angle variable, $0 \leq \Phi \leq 2\pi/9$, and $\pi \leq \Phi \leq 11\pi/9$.

15. The harmonic reducer as claimed in claim 13, wherein the outer contour line is placed in the polar coordinate system, an intersection point of the first curve and the second curve in one engagement region is disposed on the OX polar axis, and a rotation center of the cam main body coincides with the polar coordinate origin o, and an equation of the second curve is:

$$\rho = r + \omega_0 \times \cos 2\phi - \omega_1 \times \cos 4\phi,$$

wherein $\rho$ is a polar coordinate radius, r is a base radius, $\omega_0$ and $\omega_1$ are deformation coefficients, $\Phi$ is an angle variable, $$\frac{7\pi}{9} \leq \phi \leq \pi$$

and $$\frac{16\pi}{9} \leq \phi \leq 2\pi.$$

16. The harmonic reducer as claimed in claim 13, wherein the outer contour line is placed in the polar coordinate system, an intersection point of the first curve and the second curve of one engagement region is disposed on the OX polar axis, and a rotation center of the cam main body coincides with the polar coordinate origin o, and an equation of an outer contour curve of the non-engagement region is:

$$\rho = r + \omega_0 \times \cos 2\phi,$$

wherein $\rho$ is a polar coordinate radius, r is a base radius, $\omega_0$ is a deformation coefficient, $\Phi$ is an angle variable, $$\frac{2\pi}{9} \leq \phi \leq \frac{7\pi}{9}$$

and $$\frac{11\pi}{9} \leq \phi \leq \frac{16\pi}{9}.$$

17. The harmonic reducer as claimed in claim 12, wherein there are three engagement regions, and there are three non-engagement regions; and the three engagement regions and the three non-engagement regions are alternately distributed on an outer peripheral surface of the cam main body.

18. The harmonic reducer as claimed in claim 17, wherein the first curve and the non-engagement region contour curve adjacent to each other are a same curve.

19. The harmonic reducer as claimed in claim 18, wherein a rotation center of the cam main body coincides with an origin o of a polar coordinate system, and an intersection point of the first curve and the second curve in one engagement region is placed on an OX polar axis; and a curve equation of the first curve and the non-engagement region contour curve adjacent to each other is:
$\rho = r_0 + \omega_0 \times \cos 3\phi$;

$$\frac{k-1}{3}\pi \le \phi \le \frac{2k+1}{6}\pi,$$

k=1,3,5; wherein $\rho$ is a polar coordinate radius, $r_0$ is a base radius, $\omega_0$ is a deformation coefficients, and $\Phi$ is an angle variable.

20. The harmonic reducer as claimed in claim 18, wherein the rotation center of the cam main body coincides with the origin o of a polar coordinate system, and an intersection point of the first curve and the second curve in one engagement region is placed on an 0X polar axis; and an equation of the second curve is:

$\rho = r_0 + \omega_0 \times \cos 3\phi + \omega_1 \times 3 \times \sin 4\phi - \omega_1 \times 4 \times \sin 4\phi^3$;

$$\frac{4k-1}{6}\pi \le \phi \le \frac{2k}{3}\pi,$$

k=1, 2, 3; wherein $\rho$ is a polar coordinate radius, $r_0$ is a base radius, $\omega_0$ and $\omega_1$ are deformation coefficients, and $\Phi$ is an angle variable.

\* \* \* \* \*